United States Patent
Greige et al.

(10) Patent No.: US 12,115,458 B2
(45) Date of Patent: *Oct. 15, 2024

(54) DETECTING COLLUSION IN ONLINE GAMES

(71) Applicant: Electronic Arts Inc., Redwood City, CA (US)

(72) Inventors: Laura Greige, Boston, MA (US); Meredith Trotter, San Francisco, CA (US); Sundeep Narravula, Saratoga, CA (US); Navid Aghdaie, San Jose, CA (US); Fernando de Mesentier Silva, San Francisco, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,399

(22) Filed: Aug. 1, 2023

(65) Prior Publication Data

US 2024/0017178 A1   Jan. 18, 2024

Related U.S. Application Data

(63) Continuation of application No. 17/302,837, filed on May 13, 2021, now Pat. No. 11,717,757.

(51) Int. Cl.
*A63F 13/75*   (2014.01)
*A63F 13/35*   (2014.01)

(52) U.S. Cl.
CPC ............. *A63F 13/75* (2014.09); *A63F 13/35* (2014.09)

(58) Field of Classification Search
CPC ........ A63F 13/75; A63F 13/35; A63F 13/795; A63F 13/352; A63F 13/798

USPC .......................................................... 463/29
See application file for complete search history.

(56) References Cited

U.S. PATENT DOCUMENTS

| | | | |
|---|---|---|---|
| 10,964,161 B2 | 3/2021 | Frenkel et al. | |
| 11,328,562 B2 | 5/2022 | Smart et al. | |
| 2007/0232398 A1 | 10/2007 | Aikin et al. | |
| 2011/0218948 A1* | 9/2011 | De Souza | G06N 20/00 706/12 |
| 2011/0302002 A1 | 12/2011 | Dance et al. | |
| 2012/0284791 A1 | 11/2012 | Miller et al. | |

(Continued)

FOREIGN PATENT DOCUMENTS

WO   WO2008084334 A2   7/2008

*Primary Examiner* — Michael A Cuff
(74) *Attorney, Agent, or Firm* — Lee & Hayes, P.C.

(57) ABSTRACT

A collusion detection system may detect collusion between entities participating in online gaming. The collusion detection system may identify a plurality of entities associated with and opponents within an instance of an online game, determine social data associated with the plurality of entities, determine in-game behavior data associated with the plurality of entities, and determine, for one or more pairings of the plurality of entities, respective pairwise feature sets based at least in part on the social data and the in-game behavior data. The collusion detection system may then perform anomaly detection on the respective pairwise feature sets and, in response to the anomaly detection detecting one or more anomalous pairwise feature sets, output one or more suspect pairings of the plurality of entities corresponding to the one or more anomalous pairwise feature sets as suspected colluding pairings.

20 Claims, 4 Drawing Sheets

(56) References Cited

U.S. PATENT DOCUMENTS

| | | |
|---|---|---|
| 2018/0173372 A1 | 6/2018 | Greenspan et al. |
| 2021/0133346 A1 | 5/2021 | Alsharif et al. |
| 2021/0203673 A1 | 7/2021 | dos Santos et al. |
| 2022/0362677 A1 | 11/2022 | De Mesentier Silva |

* cited by examiner

DETECTING COLLUSION IN ONLINE GAMES

CROSS-REFERENCE TO RELATED APPLICATION(S)

This application is a continuation of and claims priority to U.S. application Ser. No. 17/302,837, filed on May 13, 2021 and entitled "DETECTING COLLUSION IN ONLINE GAMES," issuing as U.S. Pat. No. 11,717,757 on Aug. 8, 2023, the entirety of which is incorporated herein by reference.

BACKGROUND

Online gaming allows for players to play a variety of electronic and/or video games with each other via network connectivity, such as via the Internet. Frustration may arise when competing with other players who collude to gain unfair advantages.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Example embodiments of this disclosure describe methods, apparatuses, computer-readable media, and system(s) for detecting collusion in online gaming. For example, an online game may include multiple entities, such as players or teams of players, where each entity is intended to compete against the other entities. Two or more of the entities that are intended to compete against one another may attain an unfair advantage by colluding against the other entities. In a particular example, an online game may include ten teams of three players that are intended to compete as opponents. Two teams of three players (e.g., a first team and a second team) may collude to obtain a two-to-one advantage by coordinating attacks on another team of three players (e.g., a third team). Similarly, in a free-for-all game, a group of two or more colluding players may obtain a similar advantage over other players playing legitimately as individuals. In some examples, the collision detection system according to this disclosure may determine that two or more of the opposing entities are colluding based at least in part on social data of the entities (e.g., in-game and/or out of game) and/or in-game behavior data.

As described in further detailed below, the systems and methods described herein are presented for exemplary and illustrative purposes; they are not indicative of applicant's product or implementation plans. Moreover, it should be understood that any reference herein to the use of player or user data would be in compliance with privacy policies that respect players' privacy, and in accordance with player privacy settings or preferences.

Generally, collusion in-games may refer to the situation in which two or more players, teams, groups or other entities that are intended to be opponents or to otherwise oppose one another collaborate, cooperate, act in concert or the like to contribute to a common cause, usually with the intention of gaining an unfair advantage over other entities. The systems and methods disclosed herein may analyze social relationships and communications and/or gameplay behavioral data to infer collusion in-games. Analysis of social relationships and communications may be based on players' gaming platform or system social interactions or connections (e.g., in-game chat, lobby chat or other game platform or system chat; gaming platform or system enabled direct messaging; friends list; guild, group or community messaging; guild, group, or community membership; etc.) and players' similar external third-party system connections and interactions and/or on players' team history (e.g., player's teammate and opponent relationships in the current and past matches in the current and/or different games). Analysis of in-game behavior data may be based on player's actions and interactions during game play (e.g., players' location over time in-game, damage dealt, ranking, etc.). Using players' external and game related social relationships and interactions, combined with in-game behavior data, systems and methods according to this disclosure may generate a feature set to differentiate colluding teams or players from non-colluding teams or players.

The feature set may then input to an anomaly detection algorithm that may output suspected colluding teams or players. Anomalies may be feature sets that are inconsistent with the distribution of the majority of feature sets. For example, an anomaly may be described as an observation which deviates so much from the other observations as to arouse suspicions that it was generated by a different mechanism.

Colluding teams or players may be removed from the match, disqualified from rewards, suspended, banned and so on. Such actions may be automatic or following a human or algorithmic review of the output of the anomaly detection algorithm. Such a review may include an investigation to manually surface additional information for making a final collusion determination.

Certain implementations and embodiments of the disclosure will now be described more fully below with reference to the accompanying figures, in which various aspects are shown. However, the various aspects may be implemented in many different forms and should not be construed as limited to the implementations set forth herein. For example, some examples provided herein relate to fighting or shooting games. Implementations are not limited to the example genres. It will be appreciated that the disclosure encompasses variations of the embodiments, as described herein. Like numbers refer to like elements throughout.

Figure 1:
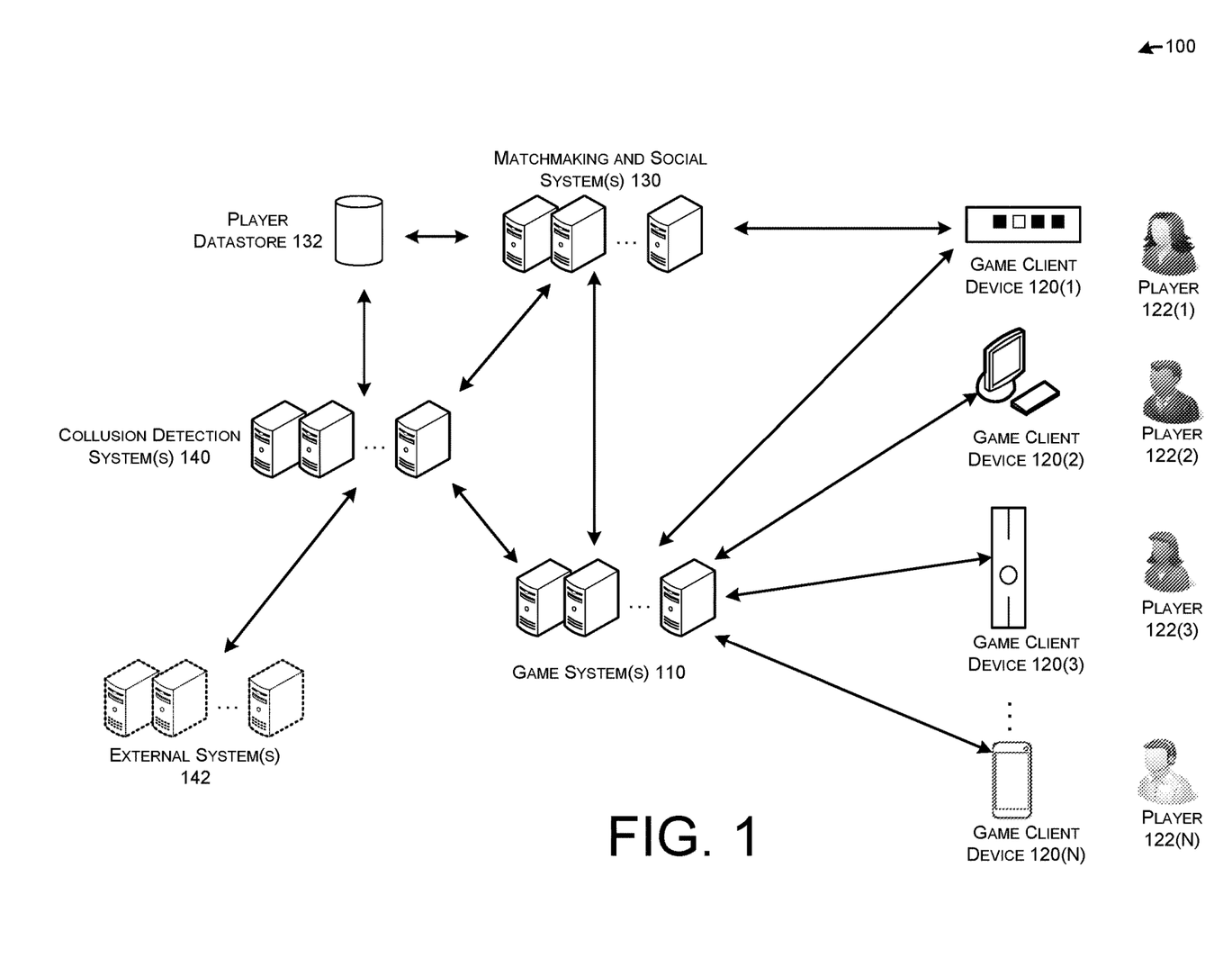
FIG. 1 illustrates a schematic diagram of an example environment with gaming system(s) and collusion detection system(s) to enable online gaming with collusion detection, in accordance with example embodiments of the disclosure.

FIG. 1 illustrates a schematic diagram of an example environment 100 with game system(s) 110, game client device(s) 120, matchmaking and social system(s) 130, a player datastore 132, collusion detection system(s) 140 and external system(s) 142 that may enable online gaming with collusion detection, in accordance with example embodiments of the disclosure.

The example environment 100 may include one or more player(s) 122(1), 122(2), 122(3), . . . 124(N), hereinafter referred to individually or collectively as player(s) 122, who may interact with respective game client device(s) 120(1), 120(2), 120(3), . . . 120(N), hereinafter referred to individually or collectively as game client device(s) 120 via respective input device(s).

The game client device(s) 120 may receive game state information from the one or more game system(s) 110 that may host the online game played by the player(s) 122 of environment 100. The game state information may be received repeatedly and/or continuously and/or as events of the online game transpire. The game state information may be based at least in part on the interactions that each of the player(s) 122 have in response to events of the online game hosted by the game system(s) 110.

The game client device(s) 120 may be configured to render content associated with the online game to respective player(s) 122 based at least on the game state information. More particularly, the game client device(s) 120 may use the most recent game state information to render current events of the online game as content. This content may include video, audio, haptic, combinations thereof, or the like content components.

As events transpire in the online game, the game system(s) 110 may update game state information and send that game state information to the game client device(s) 120. For example, if the player(s) 122 are playing an online soccer game, and the player 122 playing one of the goalies moves in a particular direction, then that movement and/or goalie location may be represented in the game state information that may be sent to each of the game client device(s) 120 for rendering the event of the goalie moving in the particular direction. In this way, the content of the online game is repeatedly updated throughout game play.

When the game client device(s) 120 receive the game state information from the game system(s) 110, a game client device 120 may render updated content associated with the online game to its respective player 122. This updated content may embody events that may have transpired since the previous state of the game (e.g., the movement of the goalie).

The game client device(s) 120 may accept input from respective player(s) 122 via respective input device(s). The input from the player(s) 122 may be responsive to events in the online game. For example, in an online basketball game, if a player 122 sees an event in the rendered content, such as an opposing team's guard blocking the point, the player 122 may use his/her input device to try to shoot a three-pointer. The intended action by the player 122, as captured via his/her input device, may be received by the game client device 120 and sent to the game system(s) 110.

The game client device(s) 120 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 120 may execute programs thereon to interact with the game system(s) 110 and render game content based at least in part on game state information received from the game system(s) 110. Additionally, the game client device(s) 120 may send indications of player input to the game system(s) 110. Game state information and player input information may be shared between the game client device(s) 120 and the game system(s) 110 using any suitable mechanism, such as application program interfaces (APIs).

The game system(s) 110 may receive inputs from various player(s) 122 and update the state of the online game based thereon. As the state of the online game is updated, the state may be sent to the game client device(s) 120 for rendering online game content to player(s) 122. In this way, the game system(s) 110 may host the online game.

The example environment 100 may further include matchmaking and social system(s) 130, hereinafter matchmaking system(s) 130 to match player(s) 122 who wish to play the same game and/or game mode with each other and to provide a platform for communication between the player(s) 122 playing online games (e.g., the same game and/or different games). The matchmaking system(s) 130 may receive an indication from the game system(s) 110 of player(s) 122 who wish to play an online game.

The matchmaking system(s) 130 may attempt matchmaking between player(s) 122. The matchmaking system(s) 130 may access information about the player(s) 122 who wish to play a particular online game, such as from a player datastore. A user account for each of the player(s) 122 may associate various information about the respective player(s) 122 and may be stored in the player datastore 132 and accessed by the matchmaking system(s) 130.

Players(s) 122 may be matched according to one or more metrics associated with the player(s) 122 such as skill at a particular game. In addition to or alternatively to skill scores, player(s) 122 may be matched on a variety of other factors. Some example matchmaking factors may be related to behavior in addition to skill and may include a player's playstyle. For example, when matching player(s) 122 as a team for a team deathmatch, the matchmaking system(s) 130 may favor matching player(s) 122 that exhibit similar levels of aggression or a mix of levels of aggression. This may alleviate the frustration experienced by players when deathmatch teams split up due to different players utilizing different tactics. Splitting a deathmatch team into different groups using different tactics can often result in a loss to an opposing team operating as a single unit with a shared tactical approach. The aspects of players' playstyle utilized for different genres or different individual games may vary from example to example.

Some other example matchmaking factors may be character or setup related such as character class, team choice, position or role preference, and so on. For example, when matching player(s) 122 for an online roleplaying game, the matchmaking system(s) 130 may consider the character classes of the player(s) 122. Other matchmaking factors may be related to teammates or teams of the player(s) 122. In an example, the matchmaking may match a player 122 to other players the player 122 plays with regularly.

Having matched the player(s) 122, the matchmaking system(s) 130 may instruct generation of instance(s) of the online game(s) for the match(es). More particularly, the matchmaking system(s) 130 may request the game system(s) 110 instantiate an online game between the matched player(s) 122. For example, the matchmaking system(s) 130 may provide connection information for the game client device(s) 120 to the game system(s) 110 for instantiation of an instance of the online game between the matched k player(s) 122. As discussed herein, instances and matches of an online game may be used interchangeably and may refer to a shared gameplay environment in which matched players play in the online game, whether a single map, multiple connected maps, or a gameplay world. In some examples, a server may host the match or instance of the game for the matched players.

As a player 122 engages in additional gameplay, the gaming system(s) 110 may provide the matchmaking system(s) 130 with some or all of the game state information. The matchmaking system(s) 130 may store the game state information or data derived from the game state information in the player datastore 132. In this manner, behavior data and/or gameplay history for the player 122 may remain up-to-date, even if or as the player's behaviors and playstyle evolve over time.

As mentioned above, the matchmaking system(s) 130 may further provide a platform for communication between the player(s) 122 playing online games (e.g., the same game and/or different games). Depending on the implementation, the matchmaking system(s) 130 may provide a social platform in which player(s) 122 may utilize friends list, communities and/or groups, and other connections to establish relationships with other player(s) 122. The matchmaking system(s) 130 may also provide direct messaging, group messaging, public messaging, chat, and/or other communications functionality to allow player(s) 122 to communicate via the social platform. Communications may be considered in-game when exchanged in the context of, or within the executable of a particular game. Communications may be considered external or extra-game when exchanged in a multi-game context (e.g., on a social platform provided by a game distribution system associated with a library of games), in contexts unrelated to the gaming system, and so on. For example, the matchmaking system(s) 130 and game system(s) 110 may be portions of a game distribution system which may provide a social platform that is not tied to a particular game. Instead, the game distribution system may provide for obtaining and playing many games. Relationships created in such an external or extra-game context may or may not be segregated from relationships created using an in-game social function. For example, the extra-game relationships formed on the game distribution system providing the game may be imported to or otherwise duplicated into the in-game social function or may be ignored and players may need to manually reform the relationships in-game if desired.

In addition, the matchmaking system(s) 130 (or the game system(s) 110) may include in-match communications functionality that may allow player(s) 122 to communicate with other player(s) 122 while in matches or instances of the online game.

In some examples, information regarding the players' 122 social relationships and/or social interactions and/or communications, whether in-match, in-game, or external, may be captured by matchmaking system(s) 130, the game system(s) 110 or another system and stored in the player datastore 132 (e.g., for use in collision detection). The level of detail and/or which types of social information is captured and stored in the player datastore 132 may vary.

In some examples, the collision detection system(s) 140 may determine that two or more opposing entities (e.g., players, teams, groups of players, etc.) are colluding based at least in part on social interaction data between the entities and/or in-game behavior data. The collision detection system(s) 140 may retrieve in-game behavior data and social interaction data from the player datastore 132, the game system(s) 110, the game client device(s) 120, the matchmaking system(s) 130, and/or external system(s) 142 (e.g., third party systems and/or external systems such as an external social media system).

The collision detection system(s) 140 may generate pairwise feature sets for each pairing of opposing entities in a match and input the feature sets into an anomaly detector to detect pairs of entities which are likely or suspected of colluding. The collision detection system(s) 140 may flag likely or suspected pairs of entities to the matchmaking system(s) 130 and/or game system(s) 110 for resolution or review. For example, the collision detection system(s) 140 may flag the pair of entities to a human reviewer associated with the game system(s) 110. The human reviewer may utilize administrative power to monitor the pair of entities in the match or in future matches or may investigate past interactions and gameplay to determine whether the pair of entities has violated the rules or terms of service of the game system(s) 110 and/or matchmaking system(s) 130. Additionally or alternatively, the collision detection system(s) 140 may cause actions to be taken automatically against the pair of entities once the pair is flagged as anomalous.

Additional details regarding the creation of a feature set for use in detecting collusion is provided below with respect to FIG. 2.

Figure 2:
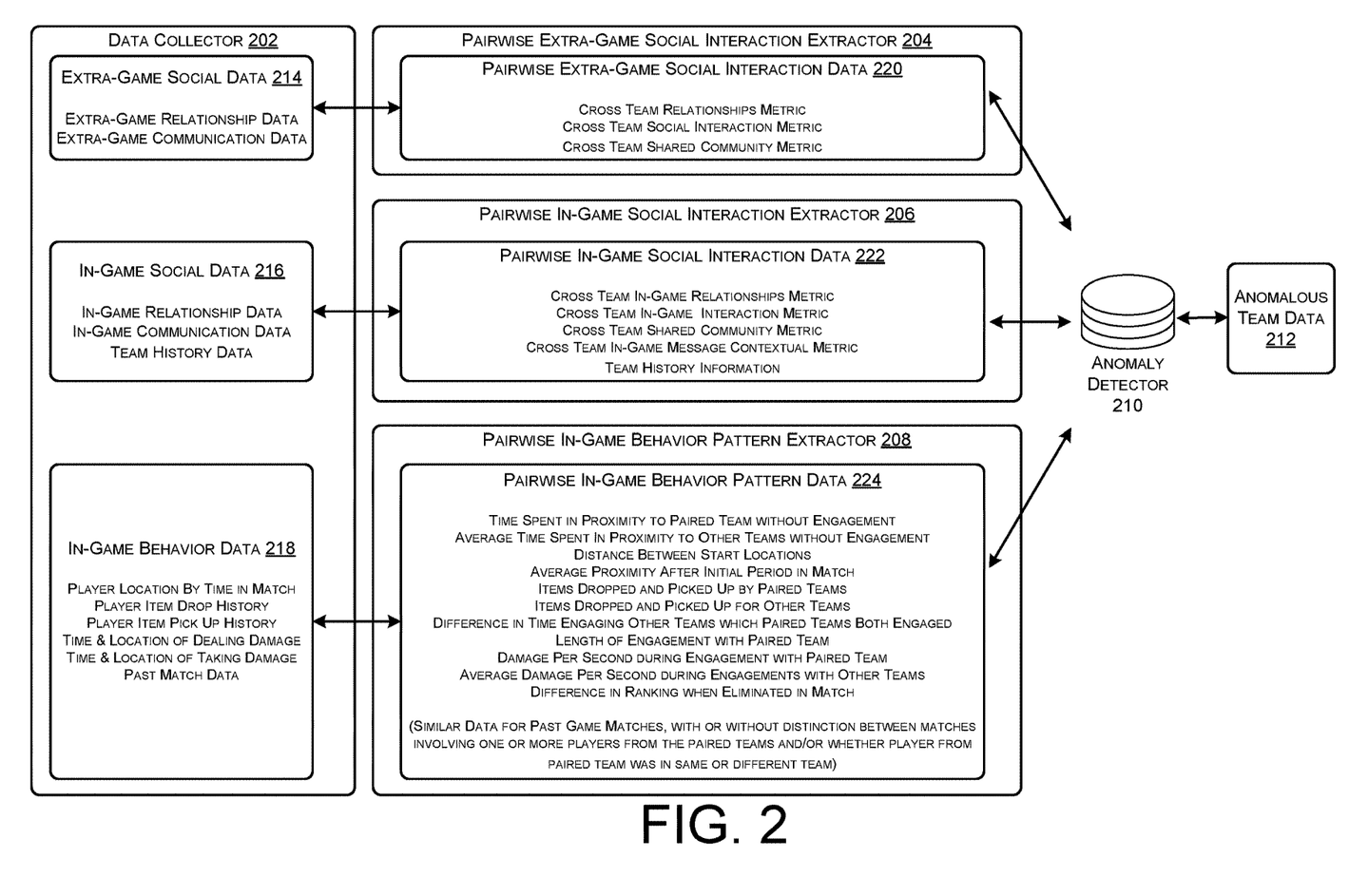
FIG. 2 illustrates a block diagram of an example collision detection system that may detect collusion among opposing entities in an online game, in accordance with example embodiments of the disclosure.

FIG. 2 illustrates an example block diagram 200 of example collision detection system(s) that may detect collusion among opposing entities in an online game, in accordance with example embodiments of the disclosure. The example collision detection system(s) may include a data collector 202, a pairwise extra-game social interaction extractor 204, a pairwise in-game social interaction extractor 206, a pairwise in-game behavior pattern extractor 208, and an anomaly detector 210. The example collision detection system(s) may operate to output anomalous team data 212 that may identify pairs of teams suspected of colluding. The illustrated collusion detection system of FIG. 2 may be an example implementation of the collision detection system(s) 140. While the example illustrated in FIG. 2 relates to collision detection between teams of multiple players, embodiments are not so limited and may also be applied to other entities (e.g., individual players in a free-for-all).

In operation, the data collector 210 of the collision detection system(s) 140 may collect extra-game social data 214, in-game social data 216 and/or in-game behavior data 218 for players participating or who participated in a match of the online game. As mentioned above, data 214-216 may be collected from one or more of the player datastore 132, the game system(s) 110, the game client device(s) 120, the matchmaking system(s) 130, and/or external system(s) 142.

The extra-game social data 214 may include extra-game relationship data and extra-game communication data. In some examples, extra-game relationship data may include relationship information, such as friend data, social media connection data, and/or community membership data of the player(s) 122. Extra-game communication data may include metadata related to communications across extra-game relationships and/or connections and/or aggregated information regarding extra-game communications (e.g., counters for the number of communications with other particular players, the number of posts by a player in a particular community, etc.). Depending on the implementation, the extra-game communication data may or may not include the content of extra-game communications and may or may not include extra-game social data from external systems (e.g., publicly available data from an independent platform).

The in-game social data 216 may include similar information to the extra-game social data 214. For example, the in-game social data 216 may include in-game relationship data and in-game messaging data. The in-game relationship data may refer to relationships such as friends, guild memberships, group memberships, party memberships, team memberships and community memberships in the game for which collusion is currently being detected. This information may include histories regarding how many matches the players have been on the same team and/or the other players present on the team in those matches. The in-game messaging data may include communications exchanged by players in the game for which collusion is currently being detected and may include communications exchanged in an out-of-match social user interface, in-match communications and/or any other communications exchanged by players in the game. In some examples, the in-game and/or match communications may be identified as messages exchanged within a player's party, group, and/or team or with players outside of the player's party, group, and/or team.

The in-game behavior data 218 may include various data about players during active game play (e.g., in match or in-gameplay). For example, for a match being analyzed to detect collusion, the in-game behavior data 218 may include the player's location over time in the match, the player's item drop history in the match, the player's items pick up history in the match, the time and location of the players when dealing damage in the match, the time and location of the players when taking damage in the match, and so on. The in-game behavior data 218 may further include similar information for past matches.

Once the data collector 202 has collected data 212-216, the extractors 204-208 may process the collected data to generate pairwise data for each pairing of entities in the match currently being analyzed (e.g., each pairing of teams, each pairing of individual players or so on).

The pairwise extra-game social interaction extractor 204 may process the extra-game social data 212 to generate pairwise extra-game social interaction data 220. In some examples, the pairwise extra-game social interaction data 220 may include a cross team relationships metric, cross team social interaction metric, a cross team shared community metric and so on.

In an example, a cross team relationships metric may be a measure or a count of a number of relationships between players of the pair of teams. If all three players of a first team of the pair are also friends with the three players of the second team of the pair on an external platform and on the game distribution platform associated with the game system(s) 110, a cross team relationships metric may be determined to be eighteen (three for each player on the first team on each platform). If one player in the first team is friends with two players in the second team on the external platform and no relationships are present on the game distribution platform, the cross team relationships metric may be determined to be two (e.g., two friendship relationships total). A cross team social interaction metric may be determined in a similar manner but may instead be a count of a number of or otherwise a measure of communications between the players via the platform(s). Such communications may include directed communications addressed to other players and indirect communications such as messages to a forum which players from both teams are participating. Similarly, a cross team shared community metric may be determined as a measure or count of the number of group or community memberships of the players in the paired teams where players from both teams are members. Other examples would be apparent in view of this disclosure.

The pairwise in-game social interaction extractor 206 may process the in-game social data 216 to generate pairwise in-game social interaction data 222. In some examples, the pairwise in-game social interaction data 222 may include a cross team in-game relationships metric, a cross team in-game interactions metric, a cross team in-game shared community metric, a cross team in-game message contextual metric, a team history metric, and so on.

In an example, the cross team in-game relationships metric, cross team in-game interactions metric, a cross team in-game shared community metric may be determined in a similar manner to that discussed above for the cross team relationships metric, cross team social interaction metric, and a cross team shared community metric. The cross team in-game message contextual metric may be a measure of whether the context of communications between players of the paired teams are indicative of coordination or collusion. One of ordinary skill in the art would be aware of various methods to train a machine learning algorithm to generate such a metric. Alternatively or additionally, the cross team in-game message contextual metric may be generated as a count of keywords specified, for example, by an operator of the collusion detection system to be indicative of coordination or collusion between players. Other variations would be apparent in view of this disclosure. The team history metric may be a measure or count of a number of times the players of the different teams of the pair of teams have been on the same team or on opposing teams. The metric may include a multiplier and/or other factor for matches involving more than two of the players from the paired teams. Other examples would be apparent in view of this disclosure.

The pairwise in-game behavior pattern extractor 208 may process the in-game behavior data 218 to generate pairwise in-game behavior pattern data 224. In some examples, the pairwise in-game behavior pattern data 224 may include measures or metrics associated with a time spent in proximity to paired team's players without engagement (e.g., within a threshold distance), an average time spent in proximity to other teams without engagement, a distance between the start locations of the paired teams, an average proximity of the paired teams at various times after an initial period in the match (e.g., every two minutes after an initial five minute period), how many and what types of items were dropped by one paired team and picked up by the other paired team, how many and what types of items were dropped by one paired team and picked up by players of the non-paired teams, a difference in match time elapsed between when one of the paired teams began engaging a non-paired team and when the other one of the paired teams began engaging the same non-paired team (e.g., for non-paired teams which both paired teams engaged in the match) and/or a difference in how long each pair team engaged the common non-paired team, the length of any engagements between the paired teams, a damage per second during engagements between paired teams, an average damage per second of the paired teams during engagements with non-paired teams, a difference in rankings of the paired teams when eliminated in the match, and so on. Similar measures or metrics may be determined for past game matches involving players of the paired teams, with or without distinction between matches involving one or more players from the paired teams and/or whether players from paired team were in same or different team relationships. For example, the past match history measures may include an average difference in ranking at the end of previous matches involving the paired teams, possibly with a threshold requirement for the similarity of team compositions (e.g., at least two of the three players from each of the paired teams also present in the same teams in the past match). Other examples would be apparent in view of this disclosure.

The pairwise extra-game social interaction data 220, the pairwise in-game social interaction data 222, and the pairwise in-game behavior pattern data 224 may be input as a feature set to the anomaly detector 210. The anomaly detector 210 may perform anomaly detection on the feature set to determine whether the pair of teams is anomalous and, by extension, suspected of collusion. In an example, the anomaly detector 210 may be utilize an isolation forest algorithm for anomaly detection. Isolation forest is a tree ensemble method. Such anomaly detection may build an ensemble of decision trees which may then be used to find outliers in the data (e.g., anomalies). Each decision tree may be built on a process of finding a way to partition the data based on a feature dimension. For example, a feature may be selected to split the data. Then, a value at which to split the selected feature may be selected. This process may be repeated to form the decision tree (e.g., where each feature split may further divide the data). An isolation forest algorithm may then analyze the group of decision trees and determine data points that can be identified with a small number of splits (e.g., meaning the data points were quickly separated from the rest of the data points, indicating they are anomalous). Implementations are not limited to a particular anomaly detection algorithm or to inputting pairwise feature sets singly, as other anomaly detection algorithms may be utilized and some examples may input the pairwise feature sets for the match simultaneously.

In a game in which a first team, a second team and one or more additional third teams are intended to be opponents against each other and the first and second teams are colluding, a pairwise feature set of the first and second teams will likely be anomalous.

As an example from the above feature set, colluding teams are likely to place closely in the ranking of a match. For example, in a battle royale game in which ten teams compete to be the last remaining team, a pair of colluding teams will likely be eliminated rapidly once the unfair advantage provided by colluding is nullified. More particularly, If two teams of three players collude, the colluding teams effectively have the firepower six players against other teams with the effective firepower three players. This may allow the six players to eliminate other teams that they otherwise could not. However, once three of the six colluding players are eliminated, the advantage is nullified and the colluding teams will likely be eliminated rapidly. In some cases, because the six colluding players may climb higher in the rankings than they should be able to based on their skill alone, the advantage may even be nullified before the numbers advantage is removed (e.g., after the elimination of two of the six players). As such, the difference in rankings of colluding teams is likely to be anomalously small compared to non-colluding teams.

Further, the colluding teams may spend a longer amount of time than average in proximity to one another, engage the same opposing teams more often than average and engage those same opposing teams closer in time than average, and deal less damage to one another if the colluding teams engage each other at all (e.g., colluding teams may engage one another for appearance sake but intentionally deal less damage), pick up more items from the other team in the pair than the average for normal opposing teams, engage in more matches including players of the other colluding team as opponents or as teammates than average and so on. Regarding social features, colluding teams are more likely to communicate more or have more relationships with players of the other colluding team than a pair of non-colluding teams.

Moreover, such anomalous features may occur in past matches and be apparent over multiple matches. For example, the feature set may include an average rate at which the pair of teams approached one another within the game world over a number of previous matches and the current match. Teams that are not colluding are just as likely to move away from each other as towards one another. Even in games with rules to force the teams together, such as by having an ever shrinking play area, colluding teams are likely to move towards each other more rapidly than average (e.g., non-colluding teams will randomly move toward or away from each other perpendicular to the direction the play area is shrinking while colluding teams will strongly prefer to move towards one another). A pattern such anomalies over multiple matches is likely to indicate the teams are colluding. The anomaly detection algorithm may be configured such that pairs of teams which are such outliers will be flagged for likely collusion.

In some examples, the anomaly detector 210 may be configured to adapt or evolve as new feature sets are input. In such examples, a feature set that was anomalous may become non-anomalous and vice versa over time as the behavior of the player base of online game changes or evolves.

The anomaly detector 210 may output anomalous team data 212 regarding the anomalous teams' feature sets. For example, the anomaly detector 210 may output the feature sets for the pairs of anomalous teams as well as the data 202-206 regarding the suspected colluding teams to a human reviewer for investigation and further action, if warranted (e.g., banning, suspension, forfeiture of in-game awards or standing, and so on).

Many variations are possible. For example, the above discussion of FIG. 2 primarily relates to pairs of teams that are colluding against other teams. The anomaly described with regard to FIG. 2 is not limited to teams. Rather, pairwise feature sets may be prepared with regard to individuals or other groupings. Moreover, the anomaly detection may be performed for more than pairs of entities. For example, a three-way feature set may be prepared to detect three-way collusion, a four-way feature set could be prepared to detect four-way collusion and so on. Additionally, the above-described feature sets are merely exemplary and many variations and alternatives will be apparent to one of ordinary skill in the art in view of this disclosure.

Figure 3:
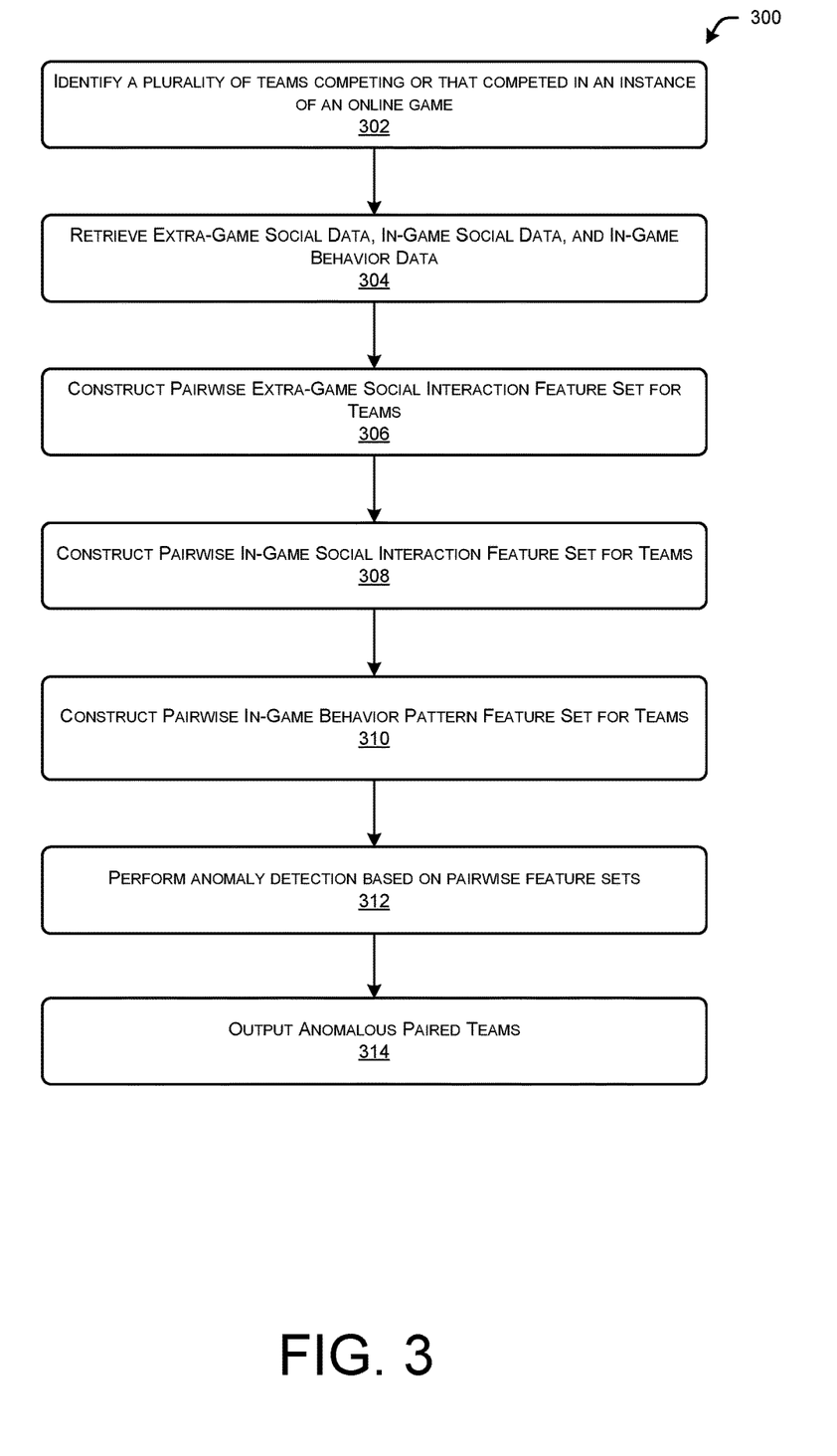
FIG. 3 illustrates a flow diagram of an example method that may detect collusion among opposing entities in an online game, in accordance with example embodiments of the disclosure.

FIG. 3 illustrates a flow diagram of an example method 300 that may detect collusion among opposing entities in an online game, in accordance with example embodiments of the disclosure. The method 300 may be performed by the collusion detection system(s) 140, individually or in cooperation with one or more other elements of the environment 100.

At block 302, the collusion detection system(s) 140 may identify a plurality of teams competing or that competed in an instance or match of an online game. The collusion detection system(s) 140 may then retrieve extra-game social data, in-game social data, and in-game behavior data for the teams in the instance of the online game at block 304.

At 306, the collusion detection system(s) 140 may construct a pairwise extra-game social interaction feature set for each pairing of the teams as discussed above with regard to FIG. 2. Similarly, at block 308, the collusion detection system(s) 140 may construct a pairwise in-game social interaction feature set for each pairing of the teams as discussed above with regard to FIG. 2. Then, at block 310, the collusion detection system(s) 140 may construct a pairwise in-game behavior pattern feature set for each pairing of the teams as discussed above with regard to FIG. 2.

The collusion detection system(s) 140 may perform anomaly detection based on pairwise feature sets at block 312. Then, the collusion detection system(s) 140 may output one or more anomalous pairs of teams (e.g., teams that are likely colluding) at block 314.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 4:
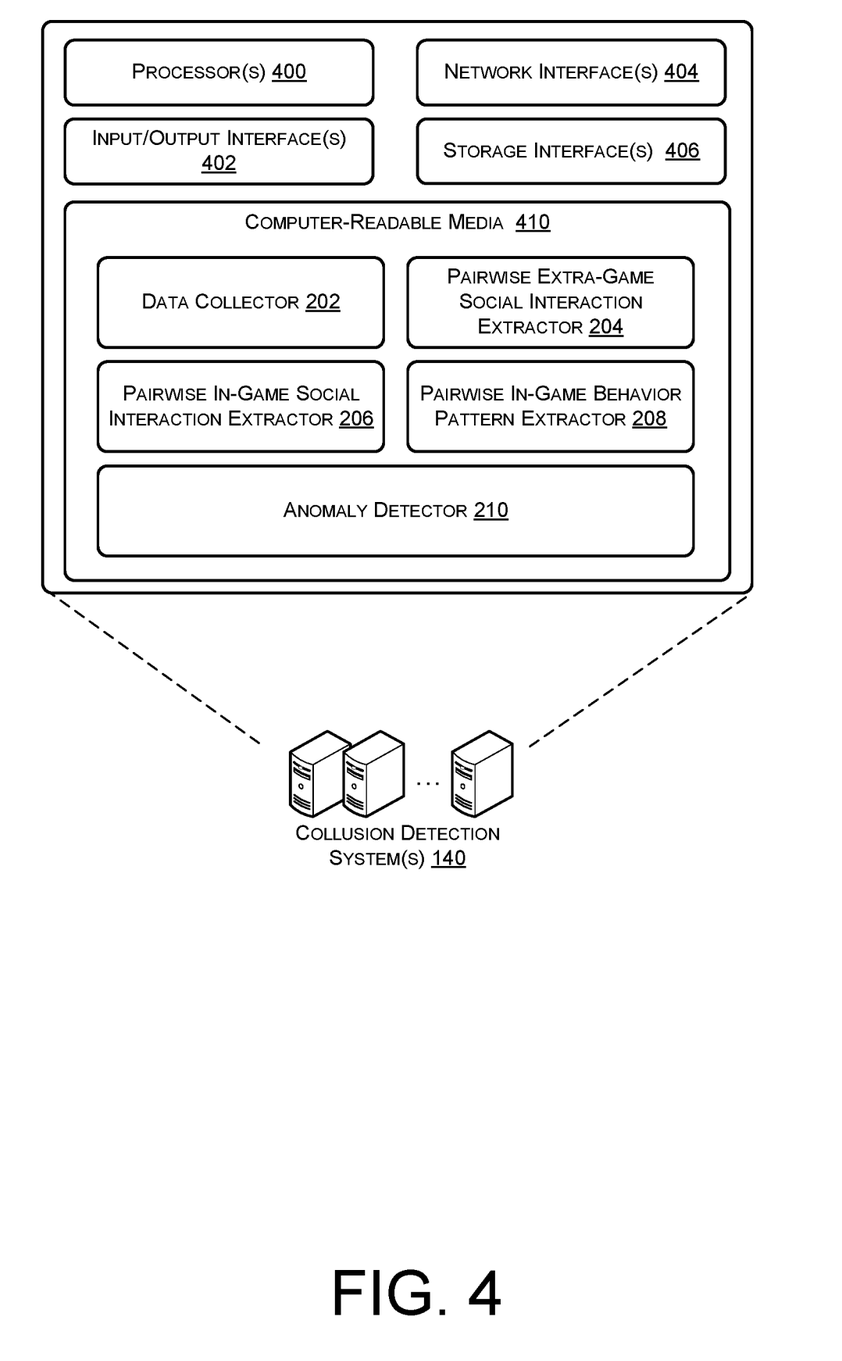
FIG. 4 illustrates a block diagram of example collusion detection system(s) that may provide collusion detection for online games, in accordance with example embodiments of the disclosure.

FIG. 4 illustrates a block diagram of example collusion detection system(s) 140 that may provide collusion detection for online games, in accordance with example embodiments of the disclosure. The collusion detection system(s) 140 may include one or more processor(s) 400, one or more input/output (I/O) interface(s) 402, one or more network interface(s) 404, one or more storage interface(s) 406, and computer-readable media 410.

In some implementations, the processors(s) 400 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 400 may possess its own local memory, which also may store program modules, program data, and/or one or more operating system(s). The one or more processor(s) 400 may include one or more cores.

The one or more input/output (I/O) interface(s) 402 may enable the collusion detection system(s) 140 to detect interaction with a user and/or other system(s), such as one or more game system(s) 110. The I/O interface(s) 402 may include a combination of hardware, software, and/or firmware and may include software drivers for enabling the operation of any variety of I/O device(s) integrated on the collusion detection system(s) 140 or with which the collusion detection system(s) 140 interacts, such as displays, microphones, speakers, cameras, switches, and any other variety of sensors, or the like.

The network interface(s) 404 may enable the collusion detection system(s) 140 to communicate via the one or more network(s). The network interface(s) 404 may include a combination of hardware, software, and/or firmware and may include software drivers for enabling any variety of protocol-based communications, and any variety of wireline and/or wireless ports/antennas. For example, the network interface(s) 404 may comprise one or more of a cellular radio, a wireless (e.g., IEEE 402.1x-based) interface, a Bluetooth® interface, and the like. In some embodiments, the network interface(s) 404 may include radio frequency (RF) circuitry that allows the collusion detection system(s) 140 to transition between various standards. The network interface(s) 404 may further enable the collusion detection system(s) 140 to communicate over circuit-switch domains and/or packet-switch domains.

The storage interface(s) 406 may enable the processor(s) 400 to interface and exchange data with the computer-readable medium 410, as well as any storage device(s) external to the collusion detection system(s) 140, such as the player datastore 132.

The computer-readable media 410 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 410 may be implemented as computer-readable storage media (CRSM), which may be any available physical media accessible by the processor(s) 400 to execute instructions stored on the computer readable media 410. In one basic implementation, CRSM may include RAM and Flash memory. In other implementations, CRSM may include, but is not limited to, ROM, EEPROM, or any other tangible medium which can be used to store the desired information and which can be accessed by the processor(s) 400. The computer-readable media 410 may have an operating system (OS) and/or a variety of suitable applications stored thereon. The OS, when executed by the processor(s) 400 may enable management of hardware and/or software resources of the collusion detection system(s) 140.

Several functional blocks having instruction, data stores, and so forth may be stored within the computer-readable media 410 and configured to execute on the processor(s)

400. The computer readable media 410 may have stored thereon the data collector 202, the pairwise extra-game social interaction extractor 204, the pairwise in-game social interaction extractor 206, the pairwise in-game behavior pattern extractor 208, and the anomaly detector 210. It will be appreciated that each of the functional blocks 202-210 may have instructions stored therein that, when executed by the processor(s) 400, may enable various functions pertaining to the operations of the collusion detection system(s) 140.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
   one or more processors; and
   one or more computer-readable media storing computer-executable instructions that, when executed by the one or more processors, cause the one or more processors to:
   identify a plurality of entities associated with an instance of an online game, wherein the plurality of entities are opponents within the instance of the online game;
   determine interaction data associated with the plurality of entities;
   determine, for a first entity of the plurality of entities and a second entity of the plurality of entities, a pairwise feature set based at least in part on the interaction data associated with the plurality of entities; and
   perform anomaly detection on the pairwise feature set.

2. The system of claim 1, wherein the computer-executable instructions further cause the one or more processors to:
   perform additional anomaly detection on a plurality of pairwise feature sets that correspond to respective pairings of the plurality of entities associated with the instance of the online game.

3. The system of claim 1, wherein the computer-executable instructions further cause the one or more processors to:
   in response to the anomaly detection detecting the pairwise feature set as anomalous, output the first entity and the second entity as a suspected colluding pair.

4. The system of claim 1, wherein the first entity is a first team of a plurality of first players and the second entity is a second team of a plurality of second players.

5. The system of claim 4, wherein the pairwise feature set includes one or more metrics associated with a relationship represented in social data of the interaction data, the relationship being between one of the plurality of first players of the first team and one of the plurality of second players of the second team.

6. The system of claim 5, wherein the relationship is a friend relationship on one of an in-game social platform, a game distribution system social platform or an external platform.

7. The system of claim 4, wherein the pairwise feature set includes one or more metrics associated with one or more past instances of the online game that included at least one of the plurality of first players and at least one of the plurality of second players.

8. The system of claim 1, wherein the pairwise feature set includes one or more metrics associated with one of:
- a difference in a first ranking of the first entity and a second ranking of the second entity for the instance of the online game;
- an amount of time the first entity and the second entity spent without engaging while within a threshold distance during the instance of the online game;
- one or more first items dropped by the first entity and picked up by the second entity during the instance of the online game;
- one or more second items dropped by the second entity and picked up by the first entity during the instance of the online game;
- one or more third entities of the plurality of entities that engaged the first entity and the second entity during the instance of the online game; or
- damage over time by one of the first entity and the second entity against the other of the first entity and the second entity.

9. A computer-implemented method comprising:
- identifying a plurality of entities associated with an instance of an online game, the plurality of entities being opponents within the instance of the online game;
- determining interaction data associated with the plurality of entities;
- determining, for one or more pairings of the plurality of entities, respective pairwise feature sets based at least in part on the interaction data associated with the plurality of entities;
- performing anomaly detection on the respective pairwise feature sets associated with the instance of the online game; and
- in response to the anomaly detection detecting one or more anomalous pairwise feature sets, outputting one or more suspect pairings of the plurality of entities corresponding to the one or more anomalous pairwise feature sets as suspected colluding pairings.

10. The computer-implemented method of claim 9, wherein the entities of the plurality of entities are teams of players, a first entity of the plurality of entities being a first team of a plurality of first players and a second entity of the plurality of entities being a second team of a plurality of second players.

11. The computer-implemented method of claim 10, wherein a respective pairwise feature set associated with the first entity and the second entity includes one or more metrics associated with a relationship represented in social data of the interaction data, the relationship being between one of the plurality of first players of the first team and one of the plurality of second players of the second team.

12. The computer-implemented method of claim 11, wherein the relationship is a friend relationship on one of an in-game social platform, a game distribution system social platform or an external platform.

13. The computer-implemented method of claim 10, wherein a respective pairwise feature set associated with the first entity and the second entity includes one or more metrics associated with one or more past instances of the online game that included at least one of the plurality of first players and at least one of the plurality of second players.

14. The computer-implemented method of claim 9, wherein a particular respective pairwise feature set of the respective pairwise feature sets is associated with a first entity of the plurality of entities and a second entity of the plurality of entities, and the particular respective pairwise feature set includes one or more metrics associated with one of:
- a difference in a first ranking of the first entity and a second ranking of the second entity for the instance of the online game;
- an amount of time the first entity and the second entity spent without engaging while within a threshold distance during the instance of the online game;
- one or more first items dropped by the first entity and picked up by the second entity during the instance of the online game;
- one or more second items dropped by the second entity and picked up by the first entity during the instance of the online game;
- one or more third entities of the plurality of entities that engaged the first entity and the second entity during the instance of the online game; or
- damage over time by one of the first entity and the second entity against the other of the first entity and the second entity.

15. One or more computer-readable media storing computer-executable instructions that, when executed by one or more processors, cause the one or more processors to perform operations comprising:
- identifying a plurality of entities associated with an instance of an online game, wherein the plurality of entities are opponents within the instance of the online game;
- determining interaction data associated with the plurality of entities;
- determining, for one or more pairings of the plurality of entities, respective pairwise feature sets based at least in part on the interaction data associated with the plurality of entities;
- performing anomaly detection on the respective pairwise feature sets associated with the instance of the online game; and
- in response to the anomaly detection detecting one or more anomalous pairwise feature sets, outputting one or more suspect pairings of the plurality of entities corresponding to the one or more anomalous pairwise feature sets as suspected colluding pairings.

16. The one or more computer-readable media of claim 15, wherein the entities of the plurality of entities are teams of players, a first entity of the plurality of entities being a first team of a plurality of first players and a second entity of the plurality of entities being a second team of a plurality of second players.

17. The one or more computer-readable media of claim 16, wherein a respective pairwise feature set associated with the first entity and the second entity includes one or more metrics associated with a relationship represented in social data of the interaction data, the relationship being between one of the plurality of first players of the first team and one of the plurality of second players of the second team.

18. The one or more computer-readable media of claim 17, wherein the relationship is a friend relationship on one of an in-game social platform, a game distribution system social platform or an external platform.

19. The one or more computer-readable media of claim 16, wherein a respective pairwise feature set associated with the first entity and the second entity includes one or more metrics associated with one or more past instances of the online game that included at least one of the plurality of first players and at least one of the plurality of second players.

20. The one or more computer-readable media of claim 15, wherein a particular respective pairwise feature set of the respective pairwise feature sets is associated with a first entity of the plurality of entities and a second entity of the plurality of entities, and the particular respective pairwise feature set includes one or more metrics associated with one of:
- a difference in a first ranking of the first entity and a second ranking of the second entity for the instance of the online game;
- an amount of time the first entity and the second entity spent without engaging while within a threshold distance during the instance of the online game;
- one or more first items dropped by the first entity and picked up by the second entity during the instance of the online game;
- one or more second items dropped by the second entity and picked up by the first entity during the instance of the online game;
- one or more third entities of the plurality of entities that engaged the first entity and the second entity during the instance of the online game; or
- damage over time by one of the first entity and the second entity against the other of the first entity and the second entity.

* * * * *